United States Patent
Hay et al.

(10) Patent No.: US 10,013,785 B2
(45) Date of Patent: Jul. 3, 2018

(54) METHODS AND SYSTEMS FOR OBJECT BASED GEOMETRIC FITTING

(71) Applicant: MyHEAT Inc., Calgary (CA)

(72) Inventors: Geoffrey J. Hay, Calgary (CA); Isabelle Couloigner, Calgary (CA)

(73) Assignee: MyHEAT Inc., Calgary (CA)

( * ) Notice: Subject to any disclaimer, the term of this patent is extended or adjusted under 35 U.S.C. 154(b) by 110 days.

(21) Appl. No.: 15/160,459

(22) Filed: May 20, 2016

(65) Prior Publication Data

US 2016/0343152 A1 Nov. 24, 2016

Related U.S. Application Data

(60) Provisional application No. 62/165,514, filed on May 22, 2015.

(51) Int. Cl.
| | |
|---|---|
| *G06T 3/00* | (2006.01) |
| *G06K 9/36* | (2006.01) |
| *G06T 11/60* | (2006.01) |
| *G06T 7/33* | (2017.01) |

(52) U.S. Cl.
CPC ............ *G06T 11/60* (2013.01); *G06T 7/337* (2017.01); *G06T 2207/10024* (2013.01); *G06T 2207/10048* (2013.01); *G06T 2207/30184* (2013.01); *G06T 2215/16* (2013.01)

(58) Field of Classification Search
CPC ........ G06K 2009/6213; G06K 9/6203; G06K 9/6204; G06T 7/30–7/344; G06T 2207/30181–2207/30192; G06T 2207/10032–2207/10044
See application file for complete search history.

(56) References Cited

U.S. PATENT DOCUMENTS

| | | | | |
|---|---|---|---|---|
| 5,067,162 | A * | 11/1991 | Driscoll, Jr. ....... | G06K 9/00067 382/126 |
| 6,888,958 | B1 * | 5/2005 | Sawa .................. | G06T 7/001 382/144 |
| 7,869,667 | B1 | 1/2011 | Wu | |
| 8,160,397 | B1 | 4/2012 | Wu | |
| 8,805,118 | B2 | 8/2014 | Wu | |
| 2001/0038718 | A1 * | 11/2001 | Kumar ................ | G06T 3/0081 382/284 |

(Continued)

OTHER PUBLICATIONS

Hay G.J., Kyle C., Hemachandran B., Chen G., Rahman M.M., Fung T.S., Arvai J.L. 2011. "Geospatial Technologies to Improve Urban Energy Efficiency." Remote Sens. 3(7); pp. 1380-1405. (http://www.mdpi.com/2072-4292/3/7/1380/).

(Continued)

*Primary Examiner* — Brian Werner
(74) *Attorney, Agent, or Firm* — Bereskin & Parr LLP/S.E.N.C.R.L., s.r.l.; Tony Orsi

(57) ABSTRACT

Described herein are various implementations of a process and a system for automatically performing object based geometric fitting. The process may include spatially superimposing a mask dataset comprising mask-objects on a raster image comprising image-objects, and locally superimposing individual mask-objects on individual image-objects, until a dataset is obtained wherein mask-objects are geometrically fitted to image-objects.

10 Claims, 9 Drawing Sheets

(56) References Cited

U.S. PATENT DOCUMENTS

| | | | | |
|---|---|---|---|---|
| 2006/0041375 A1* | 2/2006 | Witmer | ............... | G01C 15/00 701/532 |
| 2011/0286660 A1* | 11/2011 | Ofek | ............... | G06K 9/00 382/154 |
| 2013/0211790 A1* | 8/2013 | Loveland | ........ | G06K 9/00637 703/1 |
| 2015/0199557 A1* | 7/2015 | Zhang | ............... | G06K 9/6202 382/197 |
| 2016/0005145 A1* | 1/2016 | Seitz | ............... | G06K 9/6202 382/154 |

OTHER PUBLICATIONS

Castilla, G. and G.J. Hay, 2008. Image-objects and geo-objects. In: Object-Based Image Analysis—spatial concepts or knowledge-driven remote sensing applications. Eds: T. Blaschke, S. Lang, G. J. Hay. Springer-Verlag., Chapter 1.5; pp. 91-110.

Hay, G.J., and G. Castilla, 2008. Geographic Object-Based Image Analysis (GEOBIA): A new name for a new discipline? In: Object-Based Image Analysis—spatial concepts for knowledge-driven remote sensing applications. Eds: T. Blaschke, S. Lang, G. J. Hayfi. Chapter 1.4; pp. 75-89.

Rahman, M. M, G. J. Hay, I. Couloigner, B. Hemachandran, J. Bailin, Y. Zhang and A. Tam. 2013. Geographic Object-Based Mosaicing (OBM) of High-Resolution Thermal Airborne Imagery (TABI-1800) to Improve the Interpretation of Urban Image-Objects. IEEE Geoscience and Remote Sensing Letters. vol. 10, No. 4, Jul.; pp. 918-922.

Richards, J. A. Correcting and Registering Images. Chapter 2: Remote Sensing Digital Image Analysis. DOI: 10.1007/978-3-642-30062-2_2, Springer-Verlag Berlin Heidelberg 2013; pp. 27-77.

Steiniger, S., and G.J. Hay, 2009. Free and Open Source Geographic Information Tools for Landscape Ecology: A Review. Ecological Informatis. vol. 4, Issue 4, Sep.; pp. 183-195.

Wikipedia: Homogeneity—http://en.wikipedia.org/wiki/Homogeneity_(statistics). Last accessed May 21, 2015.

* cited by examiner

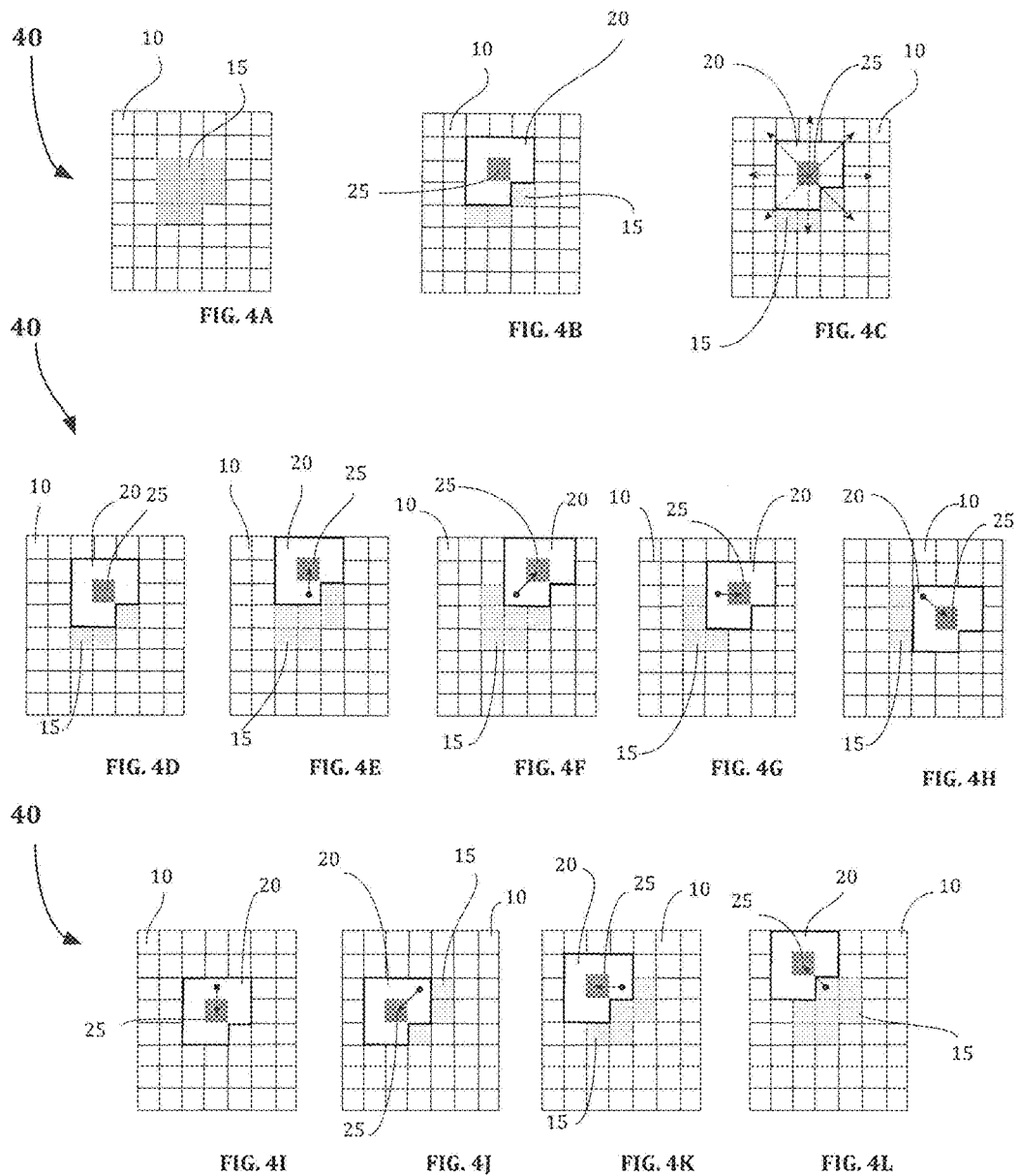

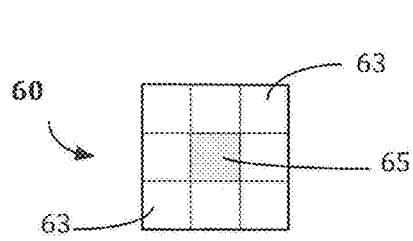
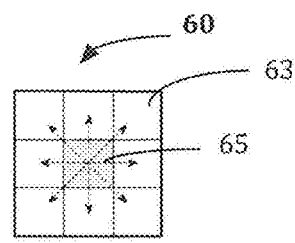
FIG. 6 A  FIG. 6 B
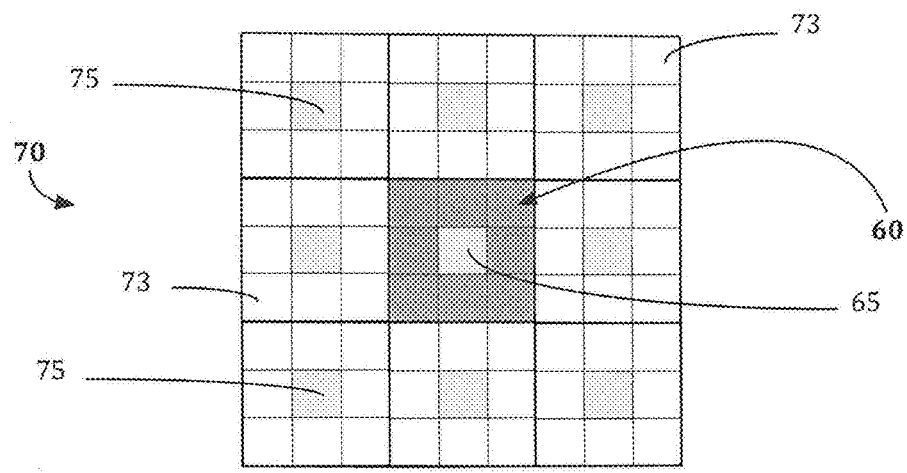
FIG. 6 C
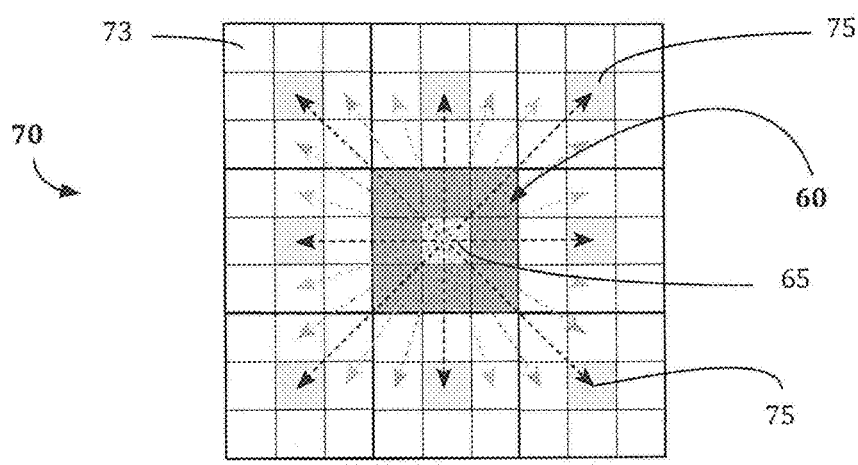
FIG. 6 D

METHODS AND SYSTEMS FOR OBJECT BASED GEOMETRIC FITTING

CROSS-REFERENCE TO RELATED PATENT APPLICATION

This application claims the benefit of U.S. Provisional Patent Application No. 62/165,514 filed May 22, 2015; the entire contents of Patent Application No. 62/165,514 are hereby incorporated by reference.

FIELD OF THE DISCLOSURE

The disclosure described herein relates to automated processes for geometric fitting of image data.

BACKGROUND OF THE DISCLOSURE

The following paragraphs are provided by way of background to the present disclosure. They are not however an admission that anything discussed therein is prior art or part of the knowledge of persons of skill in the art.

Digital image data, such as that typically required for digital mapping, may be collected using a variety of different data collection techniques. When data representing the same underlying objects of interest are collected at multiple times and/or by sensors with different (spatial, spectral, temporal, radiometric) resolutions, and then compared with each other, locational discrepancies frequently arise between two or more collected datasets. Such discrepancies may arise, for example, as a result of the use of different data collection, or data processing techniques, inadvertent or inherent error in data collection techniques, and variations with respect to the prevalent environmental conditions when, where and how the data were collected.

By way of example, the data collection efforts associated with using the GIS roof-top polygons derived from a lidar survey, or from stereo air-photography as a mask to extract the N hottest locations (commonly referred to as hot-spots) from a high-resolution thermal infrared image of the same rooftops (Hay et al, 2011) are frequently challenging to reconcile. In this case, the GIS polygons and raster thermal image may have been created, and/or collected at different times, under different conditions, from different sensors and platforms, under different spatial, spectral, and radiometric resolutions, each with their own inherent spatial errors. Thus, even though each dataset may have very similar inherent locational information, such as that captured from a global positioning system (GPS), their combined inherent spatial errors (derived independently from each acquisition platform as well as human error in the case of deriving GIS polygons) will require the non-trivial task of precisely geometrically correct each roof-top polygon to its equivalent thermal roof-top image-object, from which roof hot-spot digital numbers (DNs) can be accurately defined. For example, at a sub-meter spatial resolution, the inherent sensor error is typically 1-2 pixels. Thus, if a roof polygon is misaligned only one pixel (thus, 1 m in this example) with the corresponding thermal roof-top pixels, it could result in the defined hot-spot DNs and their locations actually representing ground pixels, or other warmer non-roof pixels (i.e., trees, grass, etc.) located 1 m away from the roof edge. If this geometric problem remains uncorrected for many 100's of 1000's of roof-tops, then the validity of the defined hot-spots is highly questionable, resulting in limited utility. Thus there is a need to automatically reduce the inherent fine spatial error between such diverse datasets; which if successful would represent an important more spatially precise way to extract location based information, from two or more different datasets.

There are many possible causes for locational discrepancies, commonly referred to as geometric errors, when producing detailed geographical maps from data acquired from unmanned aerial systems (UAS), fixed-wing aircraft airborne or satellite platforms. Discrepancies between overlapping objects of interest in two or more images, may arise as a result of different data collection methodologies, for instance, the use of different cameras with different spectral resolutions, or different camera viewing and acquisition angles. Geometric errors may also arise as a result of inadvertent platform movement associated with air turbulence, or as a result of different lighting, or weather conditions at the time of collecting the different images (Rahman et al., 2013).

In general, geometric errors may be grouped into two main categories: systematic errors and non-systematic errors. Systematic errors are typically repeatable errors caused by systematic distortions in the sensor/platform, including but not limited to scan skew, mirror scan velocity variance, platform velocity and earth rotation (Richards, 2013, p. 50-53), for example. These can typically be corrected for the entire image with mathematical formulas. Non-systematic errors, however are often more difficult to correct. These represent unforeseen changes in the sensors geometry, such as altitude variance and platform attitude (roll, pitch and yaw). They may also result from relief displacement. These errors are typically corrected by collecting specific ground control points (GCPs), and then applying image rectification methods (Richards, 2013, p. 56-57).

Methods of image rectification are commonly referred to as geometric correction methods, which are commonly subdivided in two main classes: image-to-map correction methods, and image-to-image correction methods, including both paper and digital maps with GPS coordinates (Richards, 2013 p. 57-72). In general, geometric correction process involve: (i) establishing GCPs that match the location of pixels composing the objects of interest to known locations (e.g.: on a map, or to the same objects of interest in both images); (ii) applying a mathematical model to establish the relationship between the objects of interest and their known-location (on a map, or the overlapping images); (iii) transforming the image (and related objects of interest) to the new projected geometry; and (iv) interpolating the digital numbers (i.e. pixels) composing the objects of interest into new (re-oriented) digital numbers. While geometric correction involves a family of methods for correcting images into related map coordinates (Richards, 2013 p. 59-61), it is often impractical for accurately correcting the individual non-systematic errors of large numbers of individual objects of interest over very large areas. For example, these methods are not suitable for efficiently and accurately representing the boundary location of many 100s of 1000's or millions of buildings in a large city, within an error margin of less than 1 meter. Manually geometrically correcting each building would be an extremely labor intensive and uneconomical process. This is in part, because the overall image accuracy is dependent on the geometric accuracy of the individual GCPs—which are time consuming to accurately collect and because the collection process is prone to human error. Additionally, once the geometric transformation is applied to the entire image, the accuracy of the location of an individual object of interest (and their associated GCPs) is influenced by the accuracy and location of its neighboring GCPs. Thus it is possible for geometric transformations to actually reduce both the individual and overall locational accuracy of the objects of interest.

In order to improve upon non-systematic errors inherent within two or more high-resolution images of the same location, that are required to be geometrically corrected together, the user would need to provide detailed locational improvements to large numbers of diverse objects of interest within the image-to-image geometric correction process, also referred to as geometric fitting. Geometric fitting represents the attribution of more detailed locational information to each object of interest within a scene than the general geographic information that typically accompanies an image (e.g. latitudes/longitudes, datum, etc). This is both time-consuming and would require the error-free manual collection of many additional samples. When applied to very large, detailed and complex datasets these requirements are operationally impractical.

Thus there is a need in the art for processes to accurately and efficiently geometrically fit individual objects of interest that exist within comparable separate datasets.

SUMMARY OF THE DISCLOSURE

The present disclosure relates to several implementations of automated processes that facilitate geometric fitting of data obtained using two or more different data collection processes. Accordingly, the present disclosure provides at least one example implementation of an automated process for geometric data fitting, the process comprising
(a) obtaining a raster image having a spatial resolution and comprising a plurality of image-objects representing real-world objects;
(b) obtaining a mask dataset comprising a plurality of mask-objects, each mask-object having a center, and each mask-object spatially corresponding to one of the image-objects in the raster image at the same spatial resolution;
(c) defining (i) a distance threshold and (ii) a pseudo-rotation angle applicable to a shift function;
(d) spatially superimposing the mask dataset and the raster image in such a manner that the locations of the plurality of mask-objects approximately corresponds to the locations of the plurality of corresponding image-objects;
(e) locally superimposing a plurality of mask-objects by incrementally moving the plurality of mask-objects over the spatially corresponding image-objects using a shift function including the defined (i) distance threshold and (ii) pseudo-rotation angle until an optimal homogeneity is attained for a plurality of mask-objects; and
(f) generating an optimally fitted dataset comprising a plurality of mask-objects which are individually geometrically fitted.

The present disclosure provides, in another example implementation, an automated process for geometric data fitting, the process comprising:
(a) obtaining a raster image having a spatial resolution and comprising a plurality of image-objects representing real-world objects;
(b) obtaining a mask dataset comprising a plurality of mask-objects, each mask-object having a center, and each mask-object spatially corresponding to one of the image-objects in the raster image at the same spatial resolution;
(c) defining (i) a distance threshold and (ii) a pseudo-rotation angle applicable to a shift function;
(d) spatially superimposing the mask dataset and the raster image in such a manner that the locations of the plurality of mask-objects approximately corresponds to the locations of the plurality of corresponding image-objects;
(e) locally superimposing a plurality of mask-objects by incrementally moving the plurality of mask-objects over the spatially corresponding image-objects using a shift function by, for each mask-object;
  (i) determining the homogeneity based on digital numbers in the corresponding raster image that fall within the area of the mask-object;
  (ii) incrementally shifting the mask-object around its center based on a pseudo-rotation angle projected in the x and y direction;
  (iii) at each shift increment, calculating and saving the homogeneity of the digital numbers in the raster image that fall within the overlapping area of the mask-objects;
  (iv) iterating (e)(i) to (e)(iii) until the distance threshold is reached or until an optimal homogeneity is attained; and
  (v) defining the location and boundary of the mask-object at the optimal homogeneity; and
(f) generating a fitted dataset comprising a plurality of mask-objects which are individually geometrically fitted.

In some implementations, the real-world objects represented by the raster image are geographical objects.

The present disclosure provides, in another example implementation, a computer readable medium comprising a plurality of instructions that are executable on a processing unit of a device for adapting the device to implement a method of providing an automated process for geometric data fitting according to at least one of the embodiments described herein.

Other features and advantages of the present disclosure will become apparent from the following detailed description. It should be understood, however, that the detailed description, while indicating preferred implementations of the disclosure, are given by way of illustration only, since various changes and modifications within the spirit and scope of the disclosure will become apparent to those of skill in the art from the detailed description.

BRIEF DESCRIPTION OF THE DRAWINGS

For a better understanding of the various example implementations described herein, and to show more clearly how these various embodiments may be carried into effect, reference will be made, by way of example, to the accompanying drawings which show at least one example embodiment and the drawings will now be briefly described. It is further noted that identical numbering of elements in different figures is intended to refer the same element, possibly shown situated differently, at a different size, or from a different angle. Thus, by way of example only, element (241) refers to what is intended to be the same image-object in FIG. 2 and FIG. 3.

FIGS. 4A-4L show sketches of an example implementation of certain steps in the automated process in accordance with the present disclosure. FIG. 4A shows a raster image comprising an image-object; FIG. 4B shows a raster image comprising an image-object and a mask-object (center shifted) placed over the image-object; FIG. 4C shows an illustration of a mask shift of 1 pixel in all directions, representing an incremental pseudo-rotational angle of 45°; FIG. 4D shows a 1 pixel shift from the original position of the mask; FIG. 4E shows a pseudo-angular rotational of 0° of the mask shown in FIG. 4D; FIG. 4F shows a pseudo-rotational angle of 45° of the mask shown in FIG. 4D; FIG. 4G shows a pseudo-rotational angle of 90° of the mask shown in FIG. 4D; FIG. 4H shows a pseudo-rotational angle of 135° of the mask shown in FIG. 4D; FIG. 4I shows a pseudo-rotational angle of 180° of the mask shown in FIG. 4D; FIG. 4J shows a pseudo-rotational angle of 225° of the mask shown in FIG. 4D; FIG. 4K shows a pseudo-rotational angle of 270° of the mask shown in FIG. 4D and FIG. 4L shows a pseudo-rotational angle of 315° of the mask shown in FIG. 4D.

FIG. 5A shows a true color airphoto image of the city portion; FIG. 5B shows a thermal infrared (TIR) raster image of the same city portion showing several image-objects (road section, trees rooftops); FIG. 5C shows a group of vector roof-top masks (red) geometrically overlaid on their corresponding TIR image objects for the same city portion; FIG. 5D shows a group of fitted vector roof-top mask (blue) overlaid to their corresponding TIR image objects for the same city portion and FIG. 5E shows a composite geometric overlay showing the vector mask (red) and the fitted vector roof-top mask (blue), overlaid on the TIR raster image.

FIGS. 6A-6D show sketches of a process step for enlargement of an image object, where upon such enlargement the number of available pseudo-rotational angles increases.

Figure 1:
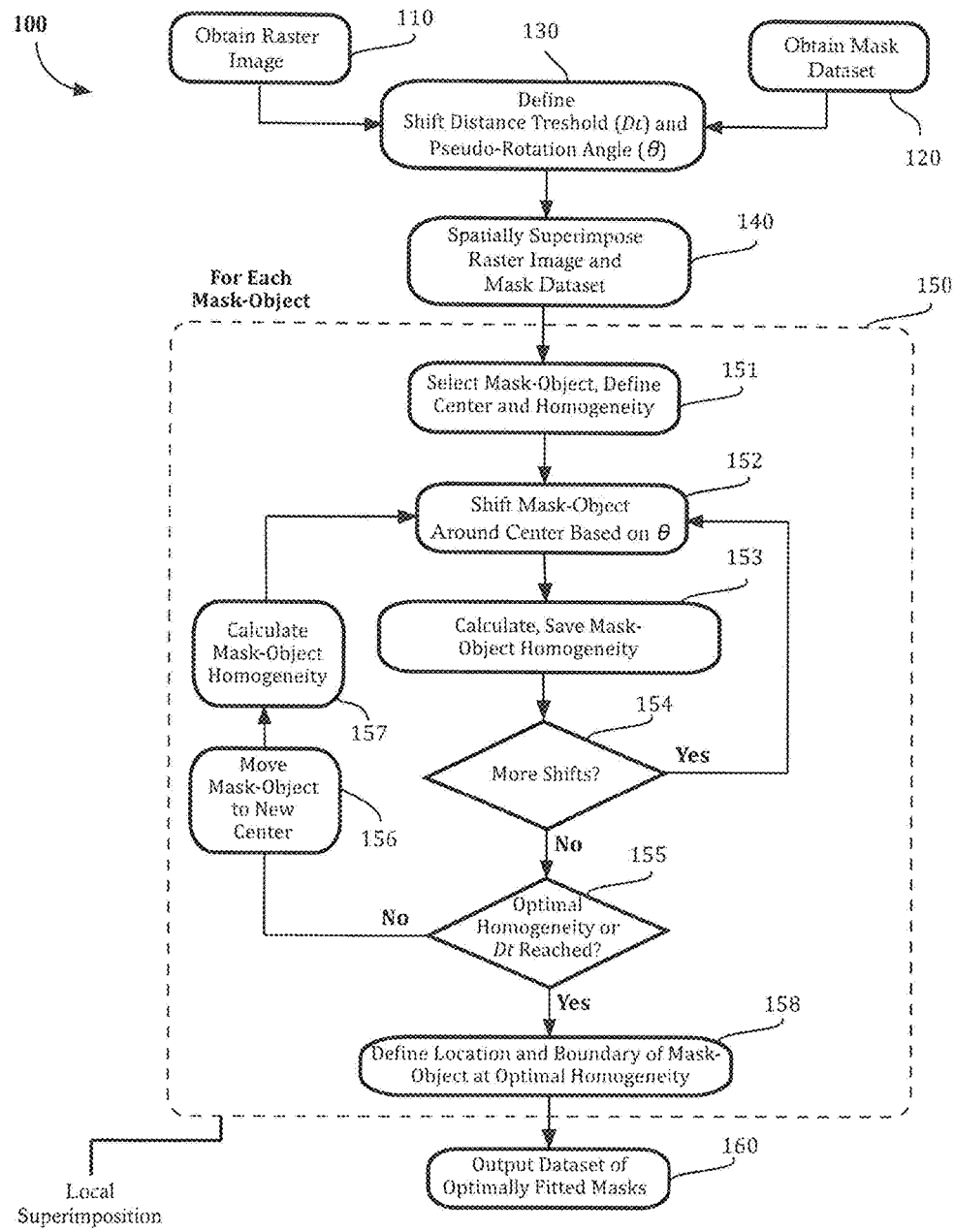
FIG. 1 shows a high level flow chart illustrating an example implementation of an automated process according to the teachings of the disclosure.

The drawings together with the following detailed description make apparent to those skilled in the art how the disclosure may be implemented in practice.

DETAILED DESCRIPTION OF THE DISCLOSURE

Various processes and systems will be described below to provide an example of an embodiment of each claimed subject matter. No embodiment described below limits any claimed subject matter and any claimed subject matter may cover processes, systems, apparatuses or devices that differ from those described below. The claimed subject matter is not limited to processes or system having all of the features of any one process, system, device or apparatus described below or to features common to multiple or all of the processes, system, devices, or apparatuses described below. It is possible that a process, system, device, or apparatus described below is not an embodiment or implementation of any claimed subject matter. Any subject matter disclosed in a process, system, device or apparatus described below that is not claimed in this document may be the subject matter of another protective instrument, for example, a continuing patent application, and the applicants, inventors or owners do not intend to abandon, disclaim or dedicate to the public any such subject matter by its disclosure in this document.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As hereinbefore mentioned, the present disclosure relates to processes for geometric fitting of data representing geometric structures. Accordingly, the herein described processes include the fitting of a raster image of a geometric structure to a mask dataset of the geometric structure. The processes provided herein allow rapid fitting of large quantities of geometric data, requiring limited computer memory and processing capacity. In addition, and importantly, the performance of the automated processes of the present disclosure results in minimal discrepancy between the raster image and the mask dataset, thereby resulting in a significant increase in accuracy of the representation of the geometric structure by the mask dataset. Accordingly, the present disclosure provides at least one example implementation of an automated process for geometric data fitting, the process comprising:

(a) obtaining a raster image having a spatial resolution and comprising a plurality of image-objects representing real-world objects;

(b) obtaining a mask dataset comprising a plurality of mask-objects, each mask-object having a center, and each mask-object spatially corresponding to one of the image-objects in the raster image at the same spatial resolution;

(c) defining (i) a distance threshold and (ii) a pseudo-rotation angle applicable to a shift function;

(d) spatially superimposing the mask dataset and the raster image in such a manner that the locations of the plurality of mask-objects approximately corresponds to the locations of the plurality of corresponding image-objects;

(e) locally superimposing a plurality of mask-objects by incrementally moving the plurality of mask-objects over the spatially corresponding image-objects using a shift function including the defined (i) distance threshold and (ii) pseudo-rotation angle until an optimal homogeneity is attained for a plurality of mask-objects; and (f) generating an optimally fitted dataset comprising a plurality of mask-objects which are individually geometrically fitted.

Terms and Definitions

The term "automated process" as used herein refers to any process carried out by a device with an electronic processing element capable of executing instructions, including but not limited to, any personal computer, desktop computer, hand-held computer, lap-top computer, tablet computer, cell phone computer or smart phone computer or other suitable electronic device.

The term "geographical objects" refers to objects with a geographical or locational reference.

The term "image-object", as used herein, refers to an object in a raster image which is visually discernable from other image-objects and/or from the raster image background as a result of a certain arrangement of pixels, the image-objects representing real-world objects distributed in a characteristic spatial resolution.

The term "mask-object" as used herein refers to an object having predefined filled boundaries, including in vector format, e.g. a line format, polygon format, or raster format.

The term "outputting" is intended to include any kind of data output, including displaying on a screen, printing a hard copy, saving as an image, and sending an image to another device, or storing an image.

The term "real world objects" is intended to include objects in a scene of any scale or dimensions including microscopic or telescopic scale, or even sub-microscopic or super-telescopic scale and dimensions. Included in the term real world objects are geographical objects.

The term "raster image" as used herein refers to an image in the form of an arrangement of pixels that is a visual representation of a real world scene by display of an array of rows (x) and columns (y) of pixels, each pixel having an (x) and (y) location in relation to neighboring pixels, and a digital number (DN) value.

The term "shift function" as used herein refers to a function defining distance and direction of movement of a mask-object over a raster image, such function including a shift distance threshold (Dt) and a pseudo-rotation angle ($\theta$).

General Implementation

Referring to FIG. 1, the present disclosure provides in one aspect an example implementation of a multi-step automated process 100.

The process 100, in accordance with the example implementation, comprises a first step 110 of obtaining a raster image having a certain spatial resolution and comprising a plurality of image-objects representing real-world objects.

The process 100 further comprises a second step 120 of obtaining a mask dataset comprising a plurality of mask-objects. The plurality of mask-objects corresponds spatially with a plurality of image-objects in the raster image, at the same spatial resolution.

The process 100 further comprises a third step 130 comprising defining a shift distance threshold (Dt) and a pseudo-rotational angle ($\theta$).

The process further comprises a fourth step 140 comprising spatially superimposing the raster image and the mask image. This superimposition step 140 is performed in such a manner that the location of the plurality of mask-objects approximately corresponds to the location of the plurality of the corresponding image-objects from the raster image.

The process 100 further comprises a fifth step 150 comprising locally superimposing the masked image dataset and the raster image. The fifth step 150 may be divided into eight sub-steps 151, 152, 153, 154, 155, 156, 157 and 158. The fifth step 150 comprises locally superimposing a plurality of mask-objects by incrementally moving the plurality of mask-objects in the mask dataset over the spatially corresponding image-objects in the raster image using a shift function. The fifth step 150 is performed for each mask-object in the mask dataset.

The process 100 further comprises a first sub-step 151 comprising selecting a mask image from the plurality of mask images in the mask dataset and defining for such mask image its center and its homogeneity.

The process 100 further comprises second, third and fourth sub-steps 152, 153 and 154, respectively, comprising incrementally shifting the selected mask-object around its calculated center based on pseudo-rotational angle ($\theta$) in accordance with a shift function and determining the object homogeneity at the shift increment. Thus the second sub-step 152 comprises shifting the selected mask-object from its calculated center to a shifted position. The third sub-step 153 comprises calculating the mask-object homogeneity in the shifted position, and saving the value obtained for the object homogeneity. The fourth sub-step 154 comprises determining whether the mask-object has been moved to all shifted positions around its calculated center in accordance with the shift function. In the event a mask-object has not been shifted to all shift positions in accordance with the shift function, the mask-object is moved to another shift position in accordance with sub-step 152 and sub-step 153 is repeated. The incremental shifts in accordance with sub-steps 152, 153 and 154 are iterated until the mask-object has shifted to all positions around the center in accordance with the shift function.

The process 100 further comprises a sub-step 155 comprising determining whether an optimal homogeneity is reached or whether the shift distance threshold (Dt) has been reached. Thus sub-step 155 comprises evaluating the plurality of saved object homogeneities obtained in the performance of sub-steps 151 and 153. Sub-step 155 further comprises providing a pre-defined optimal homogeneity. Sub-step 155 further comprises evaluating the plurality of saved object homogeneities obtained in the performance of sub-steps 151 and 153 in relation to the pre-defined object homogeneity. Sub-step 155 further comprises evaluating whether the shift distance threshold (Dt), as defined by the shift function, has been reached. In the event the pre-defined optimal homogeneity has not been reached, and the shift distance threshold (Dt) has not been reached, sub-steps 156 and 157 are performed.

The process 100 further comprises a sub-step 156 comprising moving of the mask-object to an alternate center.

The process 100 further comprises a sub-step 157 comprising calculating the mask-object homogeneity at the alternate center. Upon performance of sub-step 157, sub-steps 152, 153 and 154 are iterated, by shifting the mask-object around the alternate center based on pseudo-rotational angle ($\theta$) in accordance with a shift function and determining the object homogeneity at the shift increment.

In the event in sub-step 155 the shift distance threshold (Dt) is reached, but not the defined optimal object homogeneity, an alternate optimal object homogeneity is selected from the plurality of saved object homogeneities obtained in the performance of sub-steps 151 and 153 and sub-step 158 is performed. In the event in sub-step 155 the defined optimal object homogeneity is achieved, whether or not the shift distance threshold (Dt) has been reached, sub-step 158 is performed.

The process 100 further comprises an eighth sub-step 158 comprising defining the location and boundary of an object mask at optimal object homogeneity, such location representing an optimally fitted mask relative to its corresponding image-objects.

Upon completion of step 158 another mask-object is selected and the local superimposition step 150, including the appropriate sub-steps is repeated as hereinbefore described.

The process 100 further comprises a sixth step 160 comprising outputting a plurality of optimally fitted masks.

In a further example implementation, the present disclosure provides an automated process for geometric data fitting, the process comprising:

(a) obtaining a raster image having a spatial resolution and comprising a plurality of image-objects representing real-world objects;

(b) obtaining a mask dataset comprising a plurality of mask-objects, each mask-object having a center, and each mask-object spatially corresponding to one of the image-objects in the raster image at the same spatial resolution;

(c) defining (i) a distance threshold and (ii) a pseudo-rotation angle applicable to a shift function;

(d) spatially superimposing the mask dataset and the raster image in such a manner that the locations of the plurality of mask-objects approximately corresponds to the locations of the plurality of corresponding image-objects;

(e) locally superimposing a plurality of mask-objects by incrementally moving the plurality of mask-objects over the spatially corresponding image-objects using a shift function by, for each mask-object;

(i) determining the homogeneity based on digital numbers in the corresponding raster image that fall within the area of the mask-object;

(ii) incrementally shifting the mask-object around its center based on a pseudo-rotation angle projected in the x and y direction;

(iii) at each shift increment, calculating and saving the homogeneity of the digital numbers in the raster image that fall within the overlapping area of the mask-objects;

(iv) iterating (e)(i) to (e)(iii) until the distance threshold is reached or until an optimal homogeneity is attained; and (v) defining the location and boundary of the mask-object at the optimal homogeneity; and (f) generating a fitted dataset comprising a plurality of mask-objects which are individually geometrically fitted.

In accordance herewith, in an aspect of one implementation, the present disclosure comprises providing a raster image having a spatial resolution comprising a plurality of image-objects representing real-world objects. The raster image may be any raster image, including any pixel image, having any spatial resolution and representing any real word scene. In some implementations, the raster image comprises heterogeneous digital numbers (DNs) visually appearing to comprise image-objects i.e. perceptually discernable entities comprising similar pixels groups. In some implementations, the raster image is a geographical map, having a spatial resolution, for example, a geographical map constructed from data acquired using an unmanned aerial system (UAS), or another airborne or satellite platform. The spatial resolution of the raster image may vary, and may be, for example, in implementations of the present disclosure wherein the raster image is a geographical map, 1 kilometer, 250 meters, 10 meters or 1 meter, i.e. a single raster unit or a single pixel within the raster representing 1 square kilometer, 250 square meters, 10 square meters or 1 square meter in the real world. The real-world objects may be any real world-objects. In some implementations, the real-world objects are geographical objects, including, but not limited to buildings, roads, rivers, mountains, and the like. The amount of image-objects present in the raster image may vary. In some implementations, there are at least 100 image-objects, at least 1,000 image-objects, at least 10,000 image-objects, or at least 100,000 objects present in the raster image.

In accordance herewith, in an aspect of one implementation, the present disclosure comprises obtaining a mask dataset comprising a plurality of mask-objects, each mask-object having a center, and each mask-object spatially corresponding to one of the image-objects in the raster image at the same spatial resolution. The mask dataset may be any dataset comprising a plurality of separate mask-objects, i.e. bounded objects, for example, polygonal objects. In accordance herewith the mask dataset comprises a plurality of mask-objects wherein the mask-objects correspond with image-objects in the raster image. Mask datasets include data obtainable from geographical information systems (GIS) systems, for example: www.USGS . gov/pub-prod/maps.html and geodiscover.alberta.ca/geoportal/catalog/main/home.page. Thus, in accordance herewith, a real-world object is represented by a corresponding image-object within the raster image, and a mask-object in the mask dataset set corresponding thereto. Furthermore the raster image spatial resolution and the mask dataset spatial resolution may be the same. Thus if a raster image having a 1 m spatial resolution is provided, the mask dataset provided exhibits a 1 m spatial resolution. In accordance herewith, a mask-object comprises a center. The center in accordance herewith generally represents a geometric center of the mask-object and may be calculated using a variety of geometric functions, for example by defining the center of gravity of the mask object or by defining a center bounding box surrounding the mask object. Methods are further described in Steiniger and Hay, 2009.

In accordance herewith, in an aspect of one implementation, the present disclosure comprises defining a distance threshold (Dt) and a pseudo-rotational angle ($\theta$) applicable to a shift function. The distance threshold (Dt) represents a measure of the distance a mask-object is moved over, or relative to, a corresponding image-object (as hereinafter further detailed) In accordance herewith the, distance threshold (Dt) may be selected to be any threshold. In some embodiments the distance threshold (Dt) is relatively small, for example the mask object may be moved by across a distance of single pixel, 2 pixels, 3 pixels, 4 pixels, 5 pixels, 6 pixels, 7 pixels, 8 pixels, 9 pixels or 10 pixels. In some embodiments, the distance threshold may be selected in reference to the size of the image-objects. In some embodiments, the distance threshold is selected in such a manner that the degree of overlap between the corresponding image-object and the mask-object is not less than a predetermined value, e.g. not less than 95%, 90%, 80%, 70%, 60% or 50% of a quantitative value representing the degree of overlap between a mask-object and an image-object, after a mask-object is moved over the image-object in accordance with the shift function. The pseudo-rotational angle ($\theta$) represents a measure of the direction of shifts that is performed in accordance with a shift function (as hereinafter further detailed). In accordance herewith the, pseudo-rotational angle ($\theta$) may be selected to be any pseudo-rotational angle ($\theta$), in accordance with a shift function, including a pseudo-rotational angle ($\theta$) obtained following the performance of a step including zooming of an image-object.

Figure 2:
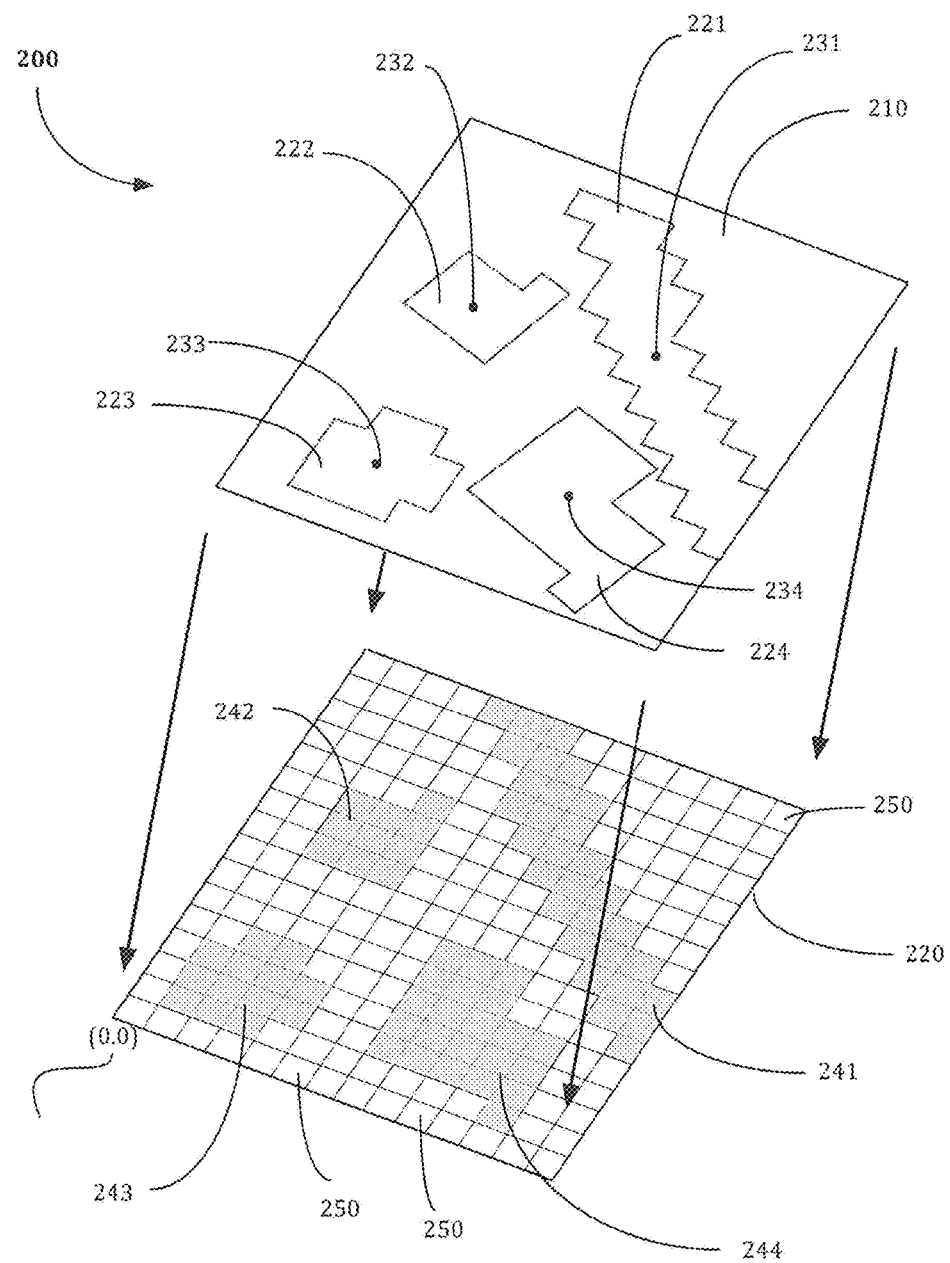
FIG. 2 shows a sketch of an example implementation of a step in the automated process in accordance with the present disclosure.
Figure 3:
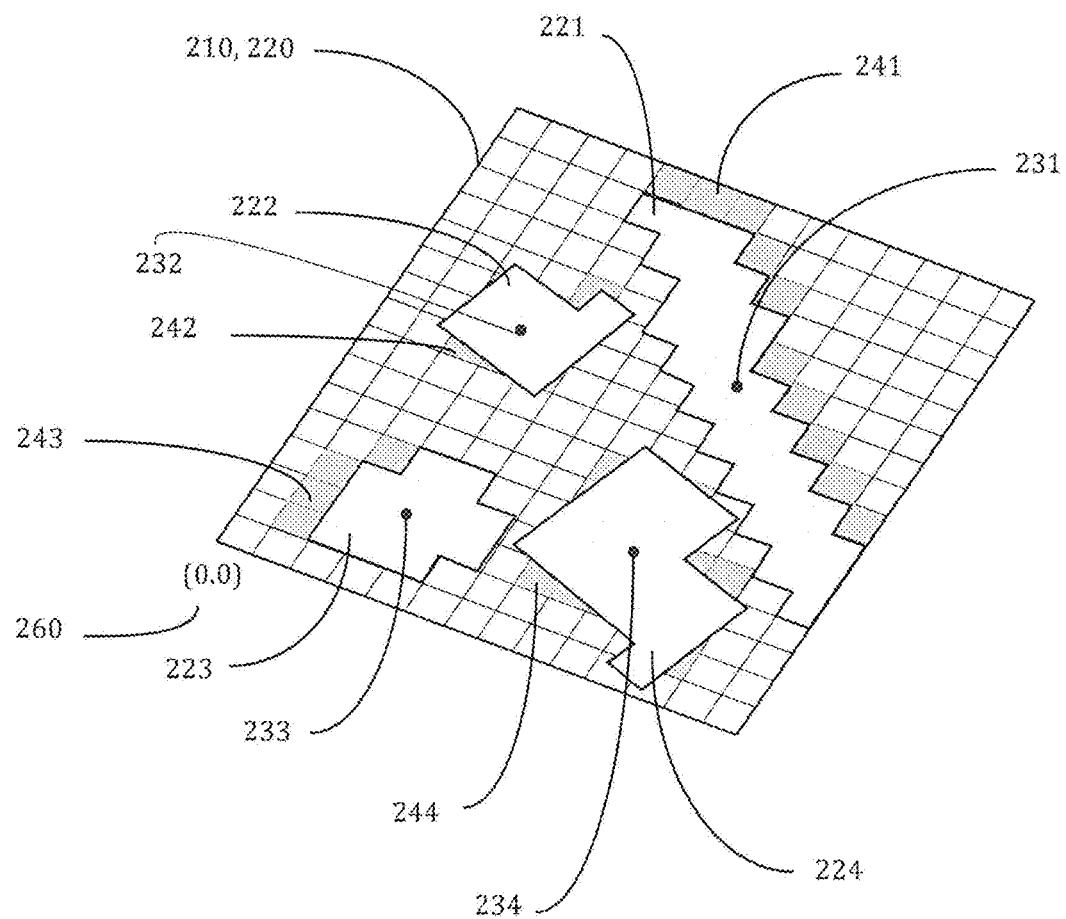
FIG. 3 shows a sketch of an example implementation of another step in the automated process in accordance with the present disclosure.

In accordance herewith, in an aspect of one implementation, the present disclosure comprises spatially superimposing a mask dataset and a raster image in such a manner that the location of a plurality of mask-objects approximately corresponds to the location of a plurality of corresponding image-objects. In one aspect, spatial superimposition is performed using general location information, for example, in implementations where the automated process of the present disclosure is used for geographical data fitting, global positioning system (GPS) data, and other general location information such as information manually provided in a map-to-image or map-to-map correction process (Richards, 2013 p 57-72). Referring now to FIG. 2 and FIG. 3, shown therein is an example implementation 200 of spatial superimposition in accordance with the present disclosure. Shown in FIG. 2 and FIG. 3 is a raster image 220, comprising a plurality of pixels 250, and four image-objects 241, 242, 243 and 244. Further shown is a mask dataset 210, comprising four mask-objects 221, 222, 223 and 224, having centers 231, 232, 233 and 234, respectively. Image-object 241 corresponds with mask image 221; image-object 242 corresponds with mask image 222; image-object 243 corresponds with mask image 223; and Image-object 244 corresponds with mask image 224. Further shown are origin (x,y) coordinates 260 (0,0). Upon spatial superimposition of raster image 220 and mask dataset 210, superimposed images comprising masked image/image-object pairs are obtained, i.e. mask image/image-object (221/241); (222/242); (223/243); and (224/244), as shown in FIG. 3. It is noted that the location of the perimeters of the image—object and bounding perimeters of the mask—objects within each pair may display a more or less significant degree of overlap. In some implementations, this degree of overlap varies substantially among various image-object/mask image pairs. In other implementations, the degree of overlap among various image-object/mask image pairs is substantially similar. In some implementations, in a subset of image-object/masked image pairs, the overlap between the locations of the bounding perimeters may be 100%, or approximately 100%, however in a not insignificant subset of image-object/masked image pairs the degree of overlap is less than 100%.

In accordance herewith, in an aspect of one implementation, the present disclosure comprises locally superimposing a plurality of mask-objects by incrementally moving the plurality of mask-objects over the spatially corresponding image-objects using a shift function. An incremental movement of a mask-object comprises a change in position of the mask-object relative to the corresponding image-object. An incremental movement further comprises a movement of the center of the mask-object from covering a certain grid unit, or pixel, to covering another grid unit, or pixel. The shift function in accordance herewith comprises a distance threshold (Dt), defining the distance a mask-object is moved relative to an image-object. The shift function further comprises a pseudo-rotational angle (θ) defining the direction in which a mask-object is moved relative to an image-object. In accordance herewith, at each incremental movement, the relative position of a mask image to an image-object is evaluated based on a degree of overlap between the position of a mask image and an image-object which is calculated and quantitated.

In accordance herewith, in an aspect of one implementation, the present disclosure comprises herewith locally superimposing a plurality of mask-objects, by, for each mask-object:
 (a) calculating the homogeneity based on the digital numbers in the corresponding raster image that fall within the area of the mask-object;
 (b) incrementally shifting the mask-object around its center based on a pseudo-rotation angle (θ) projected in the x and y direction;
 (c) at each shift increment, calculating and saving the homogeneity of the digital numbers in the raster image that fall within the area of the mask-object;
 (d) iterating steps (a) to (c) until the distance threshold is reached or until an optimal homogeneity is attained; and
 (e) defining the location and boundary of the mask-object at the optimal homogeneity.

In accordance herewith, in an aspect of one implementation, the present disclosure comprises calculating a value for the homogeneity of a mask-object/image-object pair based on digital numbers. In one implementation a value for homogeneity is calculated based on a corresponding raster image falling within an overlapping area of a mask-object superimposed on the raster image. Such calculation may be performed using any calculation capable of generating homogeneity values based on digital numbers, such methodologies including, for example, statistical methodologies, such as standard deviation, entropy and others (see further. Wikipedia entry for "homogeneity").

In accordance herewith, in an aspect of one implementation, the present disclosure comprises incrementally shifting the mask-object around its center based on a pseudo-rotational angle (θ) projected in the x and y direction. In accordance herewith, the mask-object is incrementally shifted relative to its center as defined by a shift function. Each shift increment results in a change of the position of the mask-object relative to the image-object, and each shift results in a change of the position of the center of the mask-object from covering one raster unit, or pixel, to covering another raster unit, or pixel. In some implementations, the shift function is iterated until the mask center has been positioned to cover all of the raster units, or pixels, immediately surrounding or adjacent to the raster unit, or pixel, relative to the center over which the mask-object was initially placed. In accordance herewith, pseudo-rotational angle (θ) may be selected to be any pseudo-rotational angle (θ), in accordance with a shift function.

Referring to FIGS. 4A-4L, shown therein is incremental shifting of a mask-object in accordance with a pseudo-rotational angle (θ). Shown in FIGS. 4A-4L is a series of raster images 40, each raster image comprising a raster background 10, each raster comprising a raster object 15 covering 8 pixels. FIG. 4A shows the location of the raster object 15 relative to the raster background 10. FIG. 4B shows a mask-object 20, also 8 pixels in size, placed over the image-object. Also shown is a centrally located pixel 25 of the mask-object 20. FIG. 4C shows all possible 1 pixel shifts of the mask-object 20 in various directions relative to the position of the mask-object 20 shown in FIG. 4B, representing an incremental pseudo-rotational angle increase of 45°. Thus FIG. 4E shows a 1 pixel shift from the original position of the mask (FIG. 4D) at a pseudo-rotation angle of 0°; FIG. 4F shows a 1 pixel shift from the original position of the mask (FIG. 4D) at a pseudo-rotational angle of 45°. FIG. 4G shows a 1 pixel shift from the original position of the mask (FIG. 4D) at a pseudo-rotation angle of 90°. FIG. 4H shows a 1 pixel shift from the original position of the mask (FIG. 4D) at a pseudo-rotational angle of 135°. FIG. 4I shows a 1 pixel shift from the original position of the mask at a pseudo-rotational angle of 180°. FIG. 4J shows a 1 pixel shift from the original position of the mask (FIG. 4D) at a pseudo-rotational angle of 225°. FIG. 4K shows a 1 pixel shift from the original position of the mask (FIG. 4D) at a pseudo-rotational angle of 270°. FIG. 4L shows a 1 pixel shift from the original position of the mask (FIG. 4D) at a pseudo-rotational angle of 315°. In each of FIGS. 4E-4L the arrow indicates movement of pixel 25 of the mask-object 20, relative to its position shown in FIG. 4D (and identical position in FIG. 4B). It is noted that optimal homogeneity is achieved when a 1 pixel shift of the mask-object 20 at a pseudo-rotational angle of 180° angle is performed, relative to its position in FIG. 4D, as illustrated by FIG. 4I.

In some implementations, the pseudo-rotational angle (θ) may be smaller or larger than the 45°, generated in accordance with the 1 pixel shift illustrated in FIG. 4C. Other pseudo-rotational angle (θ) angles may be attained by zooming, or enlarging the pixels composing an image-object. For example, each of the single pixels composing a raster image, instead of being represented once by a 1(x) by 1(y) raster matrix, may instead each be represented by a 3(x) by 3(y) raster matrix composed of 9 pixels, each of which has the same DN values. In another implementation, each of the single pixels composing the raster image, instead of being represented once by a 1(x) by 1(y) raster matrix, may instead each be represented by a 27(x) by 27(y) raster matrix composed of 729 pixels, each of which has the same DN values. In another, each of the single pixels composing the raster image, instead of being represented once by a 1(x) by 1(y) raster matrix, may instead each be represented by an 81(x) by 81(y) raster matrix composed of 6561 pixels each of which has the same DN values. Enlargement or zooming as described when all values maintain the same DN value as the original DN, can be facilitated by apply a Nearest Neighbor Resampling algorithm, as described in for example Richards, 2013, p. 59-61.

Enlargement allows for an increase in the precision of the pseudo-rotational angle (θ), as enlargement results in an increase in the available pixels available to which a mask-object center may be moved. Referring now to FIGS. 6A-6D, in which there is shown in an example implementation several views of an enlargement of a rectangular image-object. FIG. 6A shows a 3(x) by 3(y) image-object 60 comprising 9 pixels 63, including a central pixel 65. Shown in FIG. 6B are all possible 1 pixel shifts from the central pixel 65 (indicated by the arrows) for a mask-object (not shown) having the same size as that of the image-object 60. The smallest pseudo-rotation angle increment of a mask-object at a shift distance of 1 pixel is 45°. By performance of an enlargement step (see: FIG. 6C) of the 9 pixel image-object 60 so that every pixel is now represented by a matrix of 9(x) by 9(y) pixels, an enlarged image-object 70 consisting of a total of 81 pixels 73 is obtained. The central pixel 65 that is located within the original image-object 60 is now centrally located within the enlarged image-object 70. A total of eight other central pixels 75 with new locations are now obtained as a result of this enlargement. FIG. 6D shows enlargement 70 and the additional directions (indicated by the grey arrows) in which the center of a mask-object (not shown) may be moved over the corresponding image-object 70. These additional directions result in finer 15° verses 45° pseudo-rotational angle increments which may be used for analyzing the mask-object/image-object fit. Thus, by enlarging an image-object, as herein described, it is possible to increase the precision and reduce the distance over which a mask-object is shifted relative to an image-object.

In accordance herewith, in an aspect of one implementation, the present disclosure comprises calculating, at each shift increment, the homogeneity of the digital numbers in the raster image that fall within the area of the mask-objects, and saving the calculated homogeneity of the digital numbers in the raster image that fall within the area of the mask-objects. The homogeneity calculation for each shift may be performed using any homogeneity calculation methodology as hereinbefore described and referred to. In accordance herewith calculated homogeneity numbers may be saved in a database. It is noted that the optimal homogeneity may vary among different mask-objects.

In accordance herewith, in an aspect of one implementation, the present disclosure comprises iterating incremental shifts of a mask until the distance threshold (Dt) is reached, or until an optimal homogeneity is attained. In some implementations, after the shift function is iterated to allow the center of the mask image to cover all raster units, or pixels, immediately surrounding the raster unit, or pixel, relative to which the center of the mask was initially placed, the distance threshold (Dt) or optimal homogeneity are not attained. In such implementations, the mask-object is then moved to a different position, by moving the center of the mask-object to cover a different raster unit, or pixel, not previously covered and a new series of shifts is performed and the homogeneity values calculated and saved. In accordance with certain aspects, in one implementation, shifting of a mask-object is completed when either the distance threshold (Dt) is reached or optimal homogeneity is attained.

In some implementations, optimal homogeneity is attained without reaching the distance threshold (Dt). In such implementations the value of calculated homogeneities is compared with a predefined optimal homogeneity value. Upon a calculated homogeneity value equaling or exceeding the predefined optimal homogeneity value no further shifts of the mask-object are performed.

In some implementations, the distance threshold (Dt) is attained without attaining a defined optimal homogeneity. In such implementations, the value of calculated homogeneities is also compared with a predefined optimal homogeneity value, however none of the values of the calculated homogeneities exceeds the predefined optimal homogeneity. In such implementations, the calculated homogeneity values are compared, and from those values, an optimal homogeneity value is selected.

Thus "optimal homogeneity", as used herein is intended to mean an homogeneity having a quantitative value that exceeds a predefined homogeneity value, such value being deemed sufficient in accordance with the process that is performed, or a homogeneity having a quantitative value that represents the best possible homogeneity value among the saved set of homogeneity values obtained following the performance of all shifts upon reaching the distance threshold (Dt).

In accordance herewith, in an aspect of one implementation, the present disclosure comprises defining the location and boundary of the mask-object at the optimal homogeneity. Accordingly, the position of the mask correlating with an optimal homogeneity is identified. The location and boundary of the mask in such location is determined. Such position may be referred to as a fitted position or optimally fitted position.

In accordance herewith, in an aspect of one implementation, the present disclosure comprises generating a fitted dataset comprising a plurality of mask-objects, wherein the masks are individually geometrically fitted. Accordingly, the hereinbefore described steps are repeated for a plurality of mask-objects until for the mask-objects a location and boundary corresponding with an optimal homogeneity for all of the mask-objects are determined. A composite dataset reflecting the locations of a plurality of mask-objects correlating with optimal homogeneity positions of the mask-objects may be assembled.

Figure 5A:
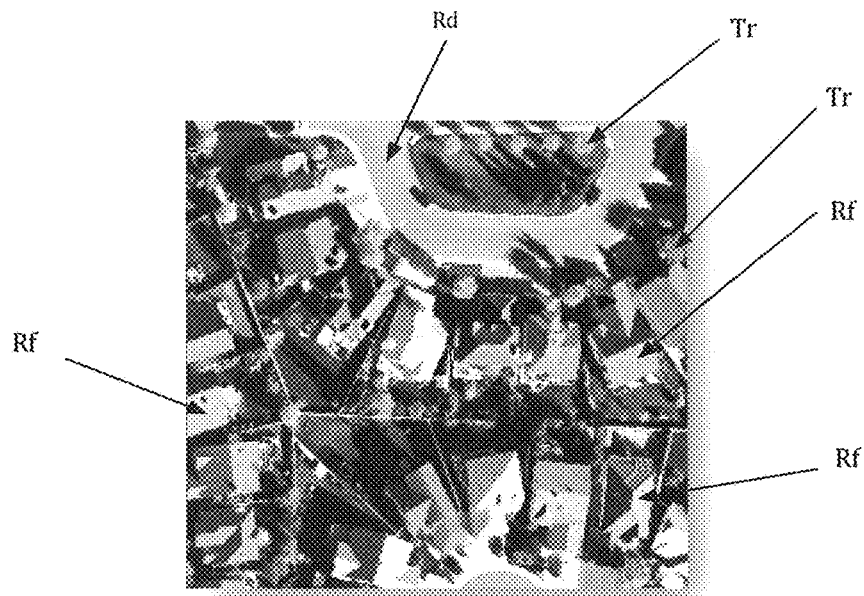
FIGS. 5A-5E show certain photographic images representing a portion of a city.
Figure 5B:
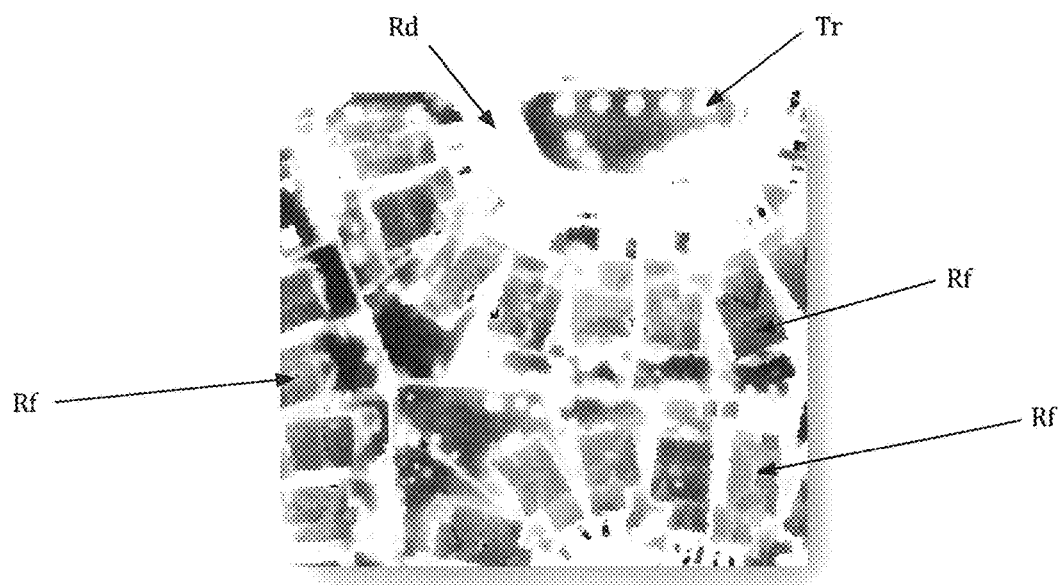
Figure 5C:
Figure 5D:
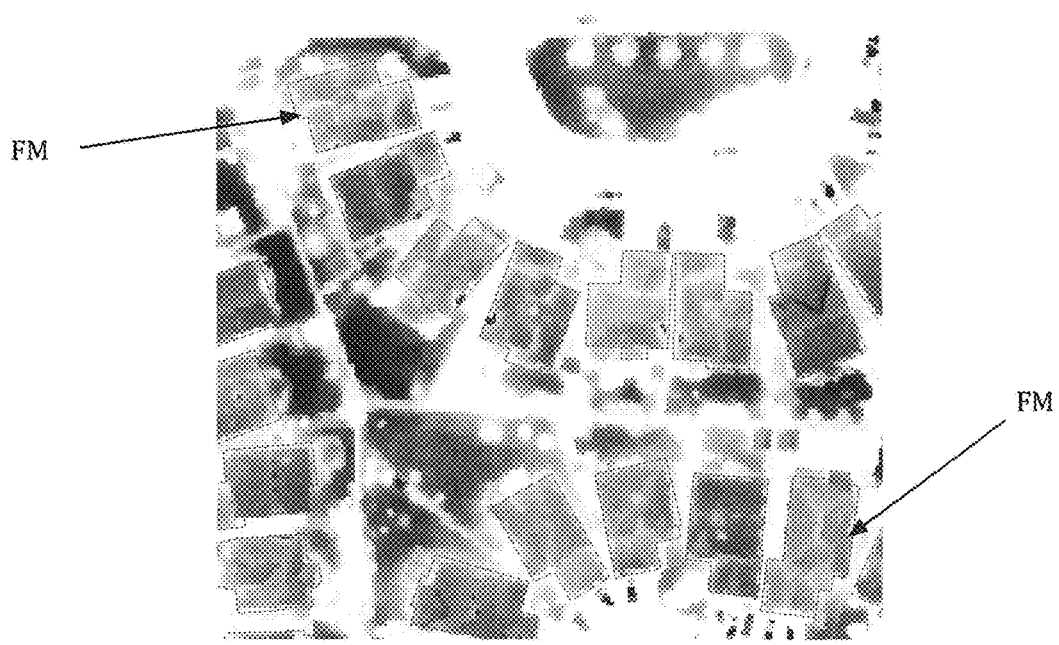
Figure 5E:
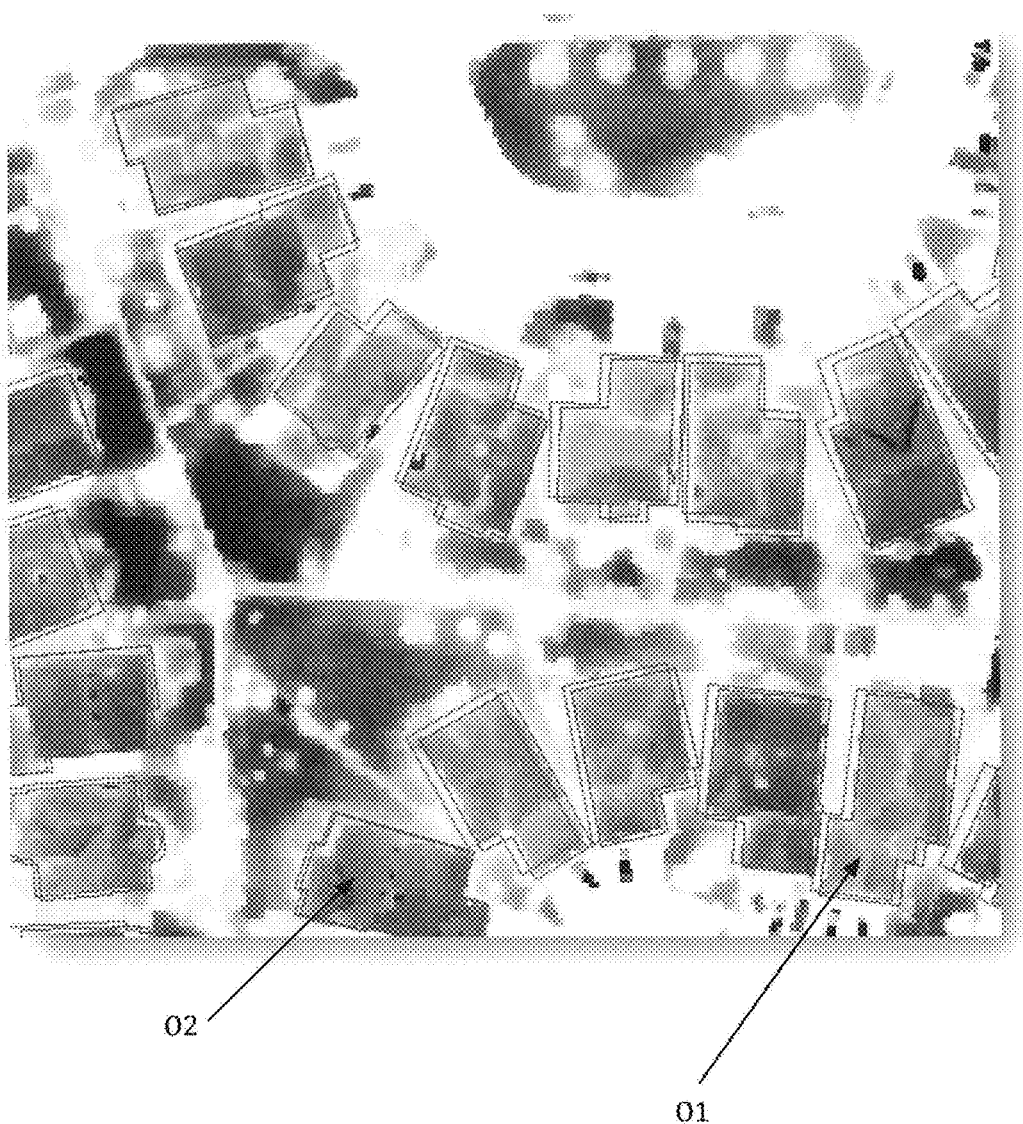

Referring now to FIGS. 5A-5E, there is shown several views of an example implementation of the process of the present disclosure involving the geometric fitting of several object images in a thermal infrared (TIR) raster image to previously defined mask-objects. FIG. 5A shows a true color air photo image of a section of a city. Visible in the image are rooftops (Rf) of houses, a road section (Rd) and trees (Tr). FIG. 5B shows the same section of the city, acquired using thermal infrared (TIR) photography and the image is a TIR raster image. Visible, again, are rooftops (Rf) of houses, a road section (Rd) and trees (Tr), all of which represent discernable image-objects. FIG. 5C shows a spatially superimposed mask dataset. The spatial superimposition is performed by geometrically overlaying the mask dataset on the TIR image using general location information present in the mask dataset. The TIR raster image remains visible underneath the mask-objects. The location and boundaries of the individual mask-objects (M) are show in red lines. FIG. 5D shows a fitted dataset wherein the individual mask-objects have been fitted to the raster objects in accordance with an implementation of the process herein disclosed. Shown are orientations of fitted individual mask-objects (FM) wherein the homogeneity has been optimized for each mask-object. Mask locations and boundaries are shown in blue. FIG. 5E shows a composite overlay showing the TIR image, the spatially superimposed mask dataset comprising the mask-objects ((M); red) and the fitted mask-objects ((FM); blue). The difference in adjustments made when comparing the various image-object/mask-object pairs is clearly visible. Thus, for example, the performance of the process, in accordance with this implementation resulted in a visually much more substantial adjustment of the mask boundaries of object 1 (O1), than those of object 2 (O2).

Upon definition of a mask-object for each image-object, location information may be assigned at the vertices of each mask-object to its corresponding fitted image-object. These locations may be considered as "slave" ground-control-points (GCP's). The GCPs may be used by traditional geometric correction software to automatically provide a highly detailed geometric correction of a raster image, and its corresponding image-objects, which can be considered the "slave" dataset, to the location of the mask-object vertices in the original (non-fitted) mask dataset which can be considered the "master" or the "map" dataset. (See: Richards, 2013-p 56-69 for a discussion on Master, Slave and Map based registration and correction).

This implementation represents the capacity to globally and automatically geometrically correct the original raster image and all its constituent image-objects to the detailed locational accuracy of the original mask dataset, which can then be considered to share map quality locational information. This represents a different data product than the geometrically fitted process described herein, which results in an output mask dataset with defined locations and boundaries for each mask-object shifted, or fitted to fit the corresponding image-objects that perceptually exist within the raster image.

In all cases described herein, the mask dataset is considered to have higher inherent locational accuracy than the raster image, as the individual masks i.e., labeled regions, and or vector polygons, are typically defined from stereo-air photography, lidar data, and or manually collected GPS locations in the field. Free access to such image and corresponding mask data may be found on many Open Data websites worldwide such as www.calgaryregionopendata.ca.

Systems

In another aspect, the present disclosure provides a system that is programmed or otherwise configured to implement the processes of the present disclosure.

Accordingly the present disclosure further comprises a system for providing automated process for geometric data fitting, wherein the system comprises:
an input interface for receiving a raster image having a spatial resolution and comprising a plurality of image-objects representing real-world objects;
an output interface for providing an indication of geometrically fitted mask-objects corresponding to the image-objects; and
a processing unit coupled to the input and the output interfaces, the processing unit being configured to generate a mask dataset comprising a plurality of mask-objects that each have a center and spatially correspond to one of the image-objects in the raster image at the same spatial resolution; to spatially superimpose the mask dataset and the raster image in such a manner that the locations of the plurality of mask-objects approximately corresponds to the locations of the plurality of corresponding image-objects; to locally superimpose the plurality of mask-objects by incrementally moving the plurality of mask-objects over the spatially corresponding image-objects using a shift function operating under a defined distance threshold and using a pseudo-rotation angle until an optimal homogeneity is attained for the plurality of mask-objects; and to define a geometrically fitted dataset comprising the plurality of geometrically shifted mask-objects which are individually optimally and geometrically fitted to the corresponding image-objects.

Figure 7:
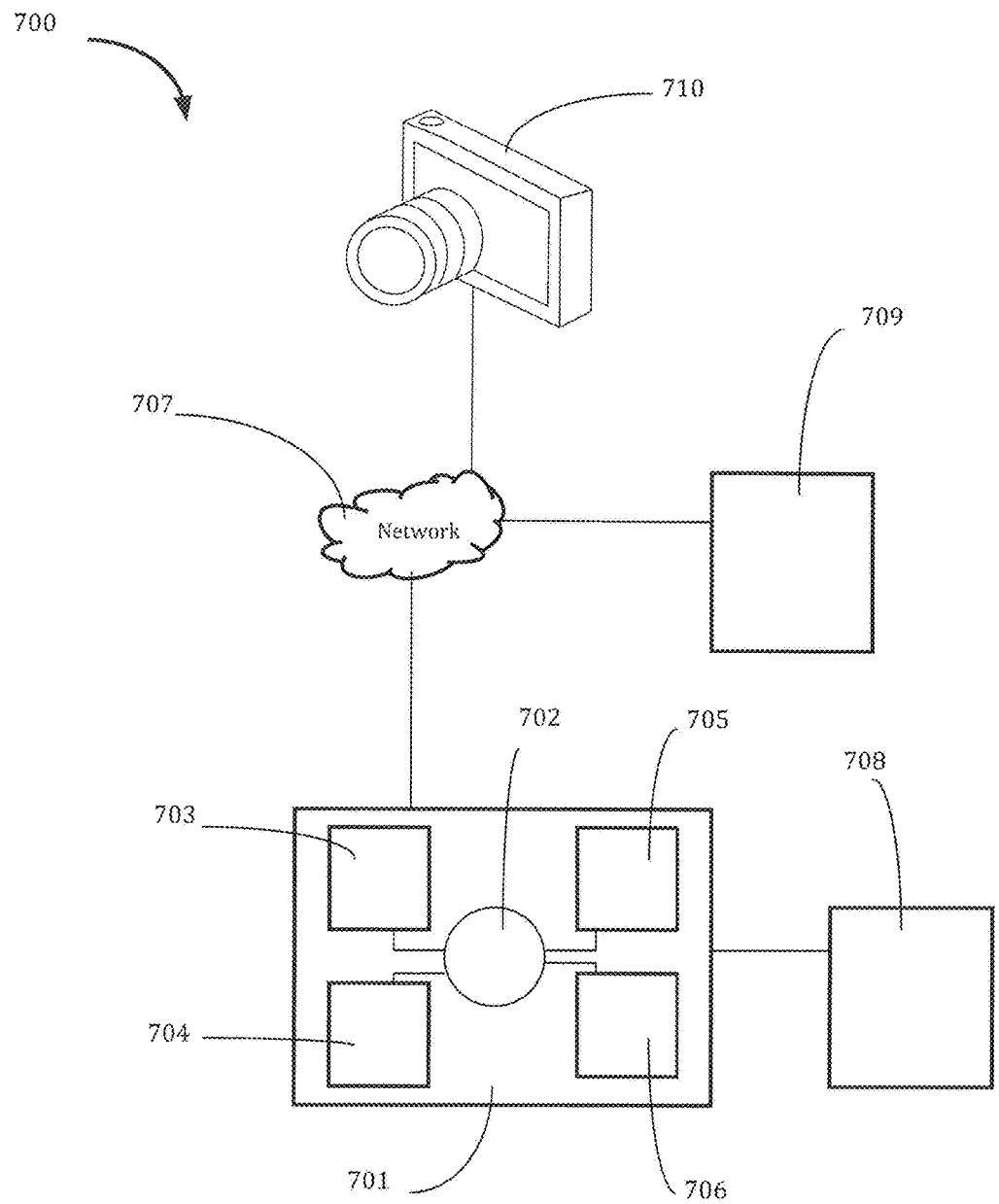
FIG. 7 shows a hardware system for performing the processes according to the teachings of the present disclosure.

Referring to FIG. 7 shown therein is a computer system programmed or otherwise configured to perform the processes of the present disclosure. The system 700 includes a computer server ("server") 701 programmed to implement the processes of the present disclosure. The server comprises a central processing unit (CPU, also referred to as "processor") 702, which may be a single core or multi core processor, or a plurality of processors. The server 701 further includes a memory 703 (e.g. a random-access memory, read-only memory, flash memory), electronic storage device (e.g. a hard disk) 704, a communication interface 705, which may comprise an input interface and an output interface, for communicating with one or more systems and peripheral devices 706, such as cache, other memory, data storage. The processor 702 is in communication with the memory 703, storage unit 704, interface 705 and peripheral devices 706. The server 701 may be operatively coupled to a computer network ("network") 707, e.g. the internet, an intra, a telecommunication network, a data network. The network 707 may include more computer servers. The electronic storage device 704 can store image data, e.g. raster images and mask datasets, and information related to these images, including for example information relating to location, or information derived from images following processing thereof, and further may be used to store computer code and machine executable instructions for the performance of the processes in accordance with the present disclosure, which may be executed by the processor 702. Computer code and machine executable instructions may also be stored on the memory 703 for access by the processor 702. Alternatively, code may be executed from another computer system 708, 709.

The server 701 can communicate with one or more remote computer systems through the network 707. In FIG. 7, computer system 708 and 709 are located remotely relative to the server 701. Computer system 708 and 709 may be operated by separate users, each of which may wish to access data or images on the server 701. The computer systems 708 and 709 may be personal computers (e.g. a desktop or laptop computer), telephones, smartphones (e.g. iPhones), tablets (e.g. iPads), personal digital assistants and the like.

The server 701 can also be coupled to an image capture device 710. The image capture device may be any image capture device, such as a camera, air plane image capture device, and satellite image capture device. The image capture device may be a device capable of capturing images at various wavelengths, including within the visible range and within the infrared range. The server 701 may be in communication with an image capture device via a wired or wireless attachment, and via network 707. In other implementations, the image capture device comprises a memory component which may be decoupled from the image capture device and connected to the server.

At least some of the elements of the various automated processes described herein are implemented via software and may be written in a high-level procedural language such as object oriented programming or a scripting language. Accordingly, the program code may be written in C, C++ or any other suitable programming language and may comprise modules or classes, as is known to those skilled in object oriented programming. Alternatively, at least some of the elements of the various automated process described herein that are implemented via software may be written in assembly language, machine language or firmware. In either case, the program code can be stored on a storage media or on a computer readable medium that is readable by a general or special purpose electronic device having a processor, an operating system and the associated hardware and software that implements the functionality of at least one of the embodiments described herein. The program code, when read by the electronic device, configures the electronic device to operate in a new, specific and defined manner in order to perform at least one of the methods described herein.

Furthermore, at least some of the methods described herein are capable of being distributed in a computer program product comprising a transitory or non-transitory computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, tablet (e.g. iPad) or smartphone (e.g. iPhones) apps, and the like. The computer useable instructions may also be in various forms, including compiled and non-compiled code.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments described herein, the general scope of which is defined in the appended claims.

REFERENCES

Hay G.J., Kyle C., Hemachandran B., Chen G., Rahman M.M., Fung T.S., Arvai J.L. 2011. "Geospatial Technologies to Improve Urban Energy Efficiency." Remote Sens. 3(7); pp. 1380-1405. (www.mdpi.com/2072-4292/3/7/1380).

Castilla, G. and G. J. Hay, 2008. *Image-objects and geo-objects*. In: Object-Based Image Analysis—spatial concepts for knowledge-driven remote sensing applications. Eds: T. Blaschke, S. Lang, G. J. Hay. Springer-Verlag., Chapter 1.5; pp. 91-110.

Hay, G. J., and G. Castilla, 2008. *Geographic Object-Based Image Analysis (GEOBIA): A new name for a new discipline?* In: Object-Based Image Analysis —spatial concepts for knowledge-driven remote sensing applications. Eds: T. Blaschke, S. Lang, G. J. Hayfi. Chapter 1.4; pp. 75-89.

Rahman, M. M, G. J. Hay, I. Couloigner, B. Hemachandran, J. Bailin, Y. Zhang and A. Tam. 2013. Geographic Object-Based Mosaicing (OBM) of High-Resolution Thermal Airborne Imagery (TABI-1800) to Improve the Interpretation of Urban Image-Objects. IEEE Geoscience and Remote Sensing Letters. Vol 10, NO. 4, July; pp. 918-922.

Richards, J. A. Correcting and Registering Images. Chapter 2: Remote Sensing Digital Image Analysis. DOI: 10.1007/978-3-642-30062-b2_2, Springer-Verlag Berlin Heidelberg 2013; pp 27-77.

Steiniger, S., and G. J. Hay, 2009. Free and Open Source Geographic Information Tools for Landscape Ecology: A Review. Ecological Informatis. Volume 4, Issue 4, September; pp 183-195.

Wikipedia: Homogeneity-en.wikipedia.org/wiki/Homogeneity_(statistics). Last accessed May 21, 2015.

The invention claimed is:

1. An automated process for geometric data fitting, the process comprising:
   (a) obtaining a raster image having a spatial resolution and comprising a plurality of image-objects representing real-world objects, wherein the raster image is an aerially acquired earth surface image and the real-world objects are geographical objects;
   (b) obtaining a mask dataset comprising a plurality of mask-objects, each mask-object having a center, and each mask-object spatially corresponding to one of the image-objects in the raster image at the same spatial resolution;
   (c) defining (i) a distance threshold and (ii) a pseudo-rotation angle applicable to a shift function;
   (d) spatially superimposing the mask dataset and the raster image using geographical data fitting in such a manner that the locations of the plurality of mask-objects approximately corresponds to the locations of the plurality of corresponding image-objects;
   (e) locally superimposing a plurality of mask-objects by incrementally moving the plurality of mask-objects over the spatially corresponding image-objects using a shift function including the defined (i) distance threshold and (ii) pseudo-rotation angle until an optimal homogeneity is attained for a plurality of mask-objects; and
   (f) generating an optimally fitted dataset comprising a plurality of mask-objects which are individually geometrically fitted.

2. An automated process for geometric data fitting, the process comprising:
   (a) obtaining a raster image having a spatial resolution and comprising a plurality of image-objects representing real-world objects, wherein the raster image is an aerially acquired earth surface image and the real-world objects are geographical objects;
   (b) obtaining a mask dataset comprising a plurality of mask-objects, each mask-object having a center, and each mask-object spatially corresponding to one of the image-objects in the raster image at the same spatial resolution;
   (c) defining (i) a distance threshold and (ii) a pseudo-rotation angle applicable to a shift function;
   (d) spatially superimposing the mask dataset and the raster image using geographical data fitting in such a manner that the locations of the plurality of mask-objects approximately corresponds to the locations of the plurality of corresponding image-objects;

(e) locally superimposing a plurality of mask-objects by incrementally moving the plurality of mask-objects over the spatially corresponding image-objects using a shift function by, for each mask-object (i) determining the homogeneity based on digital numbers in the corresponding raster image that fall within the area of the mask-object;

(ii) incrementally shifting the mask-object around its center based on a pseudo-rotation angle projected in the x and y direction;

(iii) at each shift increment, calculating and saving the homogeneity of the digital numbers in the raster image that fall within the overlapping area of the mask-objects;

(iv) iterating (e)(i) to (e)(iii) until the distance threshold is reached or until an optimal homogeneity is attained; and (v) defining the location and boundary of the mask-object at the optimal homogeneity; and (f) generating a fitted dataset comprising a plurality of mask-objects which are individually geometrically fitted.

3. A system for providing automated process for geometric data fitting, wherein the system comprises:

an input interface for receiving a raster image having a spatial resolution and comprising a plurality of image-objects representing real-world objects, wherein the raster image is an aerially acquired earth surface image and the real-world objects are geographical objects;

an output interface for providing an indication of geometrically fitted mask-objects corresponding to the image-objects; and a processing unit coupled to the input and the output interfaces, the processing unit being configured to generate a mask dataset comprising a plurality of mask-objects that each have a center and spatially correspond to one of the image-objects in the raster image at the same spatial resolution; to spatially superimpose the mask dataset and the raster image using geographical data fitting in such a manner that the locations of the plurality of mask-objects approximately corresponds to the locations of the plurality of corresponding image-objects; to locally superimpose the plurality of mask-objects by incrementally moving the plurality of mask-objects over the spatially corresponding image-objects using a shift function operating under a defined distance threshold and using a pseudo-rotation angle until an optimal homogeneity is attained for the plurality of mask-objects; and to define a geometrically fitted dataset comprising the plurality of geometrically shifted mask-objects which are individually optimally and geometrically fitted to the corresponding image-objects.

4. The system of claim 3, wherein the processing unit is configured to display geometrically fitted mask-objects which are individually optimally geometrically fitted to the corresponding image objects via the output interface.

5. The system of claim 3, wherein the processing unit is configured to store the geometrically fitted dataset in a memory element.

6. The system of claim 3, wherein the processing unit is configured to send the geometrically fitted dataset to another electronic device.

7. The system of claim 3, wherein the processing unit is configured to define the distance threshold and the pseudo-rotation angle applicable to a shift function prior to shifting the plurality of mask-objects.

8. An automated process for geometric data fitting, wherein the process comprises:

i) providing an input interface for receiving a raster image having a spatial resolution and comprising a plurality of image-objects representing real-world objects, wherein the raster image is an aerially acquired earth surface image and the real-world objects are geographical objects;

ii) providing an output interface for providing an indication of geometrically fitted mask-objects corresponding to the image-objects; and iii) providing a processing unit coupled to the input and the output interfaces, the processing unit being configured to generate a mask dataset comprising a plurality of mask-objects that each have a center and spatially correspond to one of the image-objects in the raster image at the same spatial resolution; to spatially superimpose the mask dataset and the raster image using geographical data fitting in such a manner that the locations of the plurality of mask-objects approximately corresponds to the locations of the plurality of corresponding image-objects; to locally superimpose the plurality of mask-objects by incrementally moving the plurality of mask-objects over the spatially corresponding image-objects using a shift function operating under a defined distance threshold and using a pseudo-rotation angle until an optimal homogeneity is attained for the plurality of mask-objects; and to define a geometrically fitted dataset comprising the plurality of geometrically shifted mask-objects which are individually optimally and geometrically fitted to the corresponding image-objects; and iv) operating the automated process using the input interface, the output interface and the processing unit to obtain the geometrically fitted dataset comprising the plurality of geometrically shifted mask-objects which are individually optimally and geometrically fitted to the corresponding image-objects.

9. The process according to claim 8 wherein the processing unit is configured to send the geometrically fitted dataset to another electronic device.

10. The process according to claim 8 wherein processing unit is configured to define the distance threshold and the pseudo-rotation angle that are applicable to the shift function prior to shifting the plurality of mask-objects.

* * * * *